US012594649B2

(12) United States Patent
Fiddes et al.

(10) Patent No.: US 12,594,649 B2
(45) Date of Patent: Apr. 7, 2026

(54) TOOL BIT

(71) Applicant: MILWAUKEE ELECTRIC TOOL CORPORATION, Brookfield, WI (US)

(72) Inventors: Matthew J. Fiddes, Milwaukee, WI (US); Benjamin L. Miller, Milwaukee, WI (US); James J. Van Essen, Hales Corners, WI (US); Evan H. Fischer, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 359 days.

(21) Appl. No.: 18/144,284

(22) Filed: May 8, 2023

(65) Prior Publication Data

US 2023/0356370 A1 Nov. 9, 2023

Related U.S. Application Data

(60) Provisional application No. 63/339,187, filed on May 6, 2022.

(51) Int. Cl.

*B25B 23/00* (2006.01)
*B25B 15/00* (2006.01)
*B25B 21/02* (2006.01)

(52) U.S. Cl.

CPC ........ *B25B 23/0035* (2013.01); *B25B 15/005* (2013.01); *B25B 21/02* (2013.01)

(58) Field of Classification Search

CPC ..... B25B 15/00; B25B 15/002; B25B 15/004; B25B 15/005; B25B 15/007; B25B 23/0007; B25B 23/0014; B25B 23/0035

See application file for complete search history.

(56) References Cited

U.S. PATENT DOCUMENTS 3,848,931 A 11/1974 Swisher
5,704,261 A * 1/1998 Strauch ................. B25B 15/005 81/436
6,393,950 B1 * 5/2002 Crosser ................... B25B 13/56 81/177.1
6,792,831 B2 * 9/2004 Crosser ................... B25B 13/56 81/166
7,107,882 B1 * 9/2006 Chang ..................... B25B 15/02 81/125
8,418,587 B2 * 4/2013 DeBaker ................ B23P 15/00 81/436

(Continued)

FOREIGN PATENT DOCUMENTS

CN 109277977 A 1/2019
DE 8903996 U1 8/1990

(Continued)

*Primary Examiner* — David B. Thomas
(74) *Attorney, Agent, or Firm* — Michael Best & Friedrich LLP

(57) ABSTRACT

A tool bit including a drive portion having a first maximum outer dimension, a tip having a second maximum outer dimension, a shank extending between the drive portion and the tip, and a sleeve. The shank has a third maximum outer dimension that is less than first and second maximum outer dimensions. The sleeve extends from the drive portion to the tip and surrounds the shank. The sleeve engages a portion of the shank such that the sleeve is inhibited from moving relative to the shank.

20 Claims, 10 Drawing Sheets

(56) References Cited

U.S. PATENT DOCUMENTS

| | | | | |
|---|---|---|---|---|
| 8,800,407 | B2 * | 8/2014 | DeBaker | B25B 15/002 81/436 |
| 9,415,491 | B1 * | 8/2016 | Hewitt | B25B 23/0035 |
| 10,780,508 | B2 | 9/2020 | Foser | |
| 2004/0007095 | A1 * | 1/2004 | Meng | B25B 27/18 81/53.2 |
| 2005/0028651 | A1 * | 2/2005 | Crosser | G09F 3/00 81/180.1 |
| 2008/0034928 | A1 * | 2/2008 | Sheu | B25B 15/001 81/436 |
| 2010/0011918 | A1 * | 1/2010 | Ray | B25B 23/12 81/451 |
| 2010/0275741 | A1 * | 11/2010 | Lai | B25B 15/001 81/438 |
| 2010/0307298 | A1 * | 12/2010 | Lai | B25B 23/005 81/442 |
| 2011/0197721 | A1 * | 8/2011 | DeBaker | B23P 15/00 81/436 |
| 2014/0318328 | A1 * | 10/2014 | DeBaker | B25B 15/008 81/438 |
| 2016/0327077 | A1 * | 11/2016 | Huang | B25B 23/0057 |
| 2020/0055166 | A1 | 2/2020 | Van Essen et al. | |

FOREIGN PATENT DOCUMENTS

| | | | |
|---|---|---|---|
| DE | 102010050967 | A1 | 5/2012 |
| EP | 0392201 | A2 | 10/1990 |

* cited by examiner

TOOL BIT

CROSS-REFERENCE TO RELATED APPLICATION

This application claims priority to U.S. Provisional Patent Application No. 63/339,187, filed on May 6, 2022, the entire contents of which are incorporated herein by reference.

FIELD

The present invention relates to tool bits, and more particularly to tool bits configured for interchangeable use with a driver.

SUMMARY

In one aspect, the invention provides a tool bit including a drive portion having a first maximum outer dimension, a tip having a second maximum outer dimension, a shank extending between the drive portion and the tip, the shank having a third maximum outer dimension that is less than first and second maximum outer dimensions, and a sleeve extending from the drive portion to the tip and surrounding the shank.

In another aspect, the invention provides a tool bit including a drive portion, a tip, a shank, and a sleeve. The drive portion is configured to be inserted into a power tool. The tip is configured to engage a work piece. The shank extends between the drive portion and the tip. The sleeve surrounds at least a portion of the shank. The sleeve is injection molded around the at least a portion of the shank and engages another feature of the tool bit such that the sleeve is inhibited from rotating relative to the shank.

In another aspect, the invention provides a tool bit including a drive portion, a tip, a shank, and a sleeve. The drive portion is configured to be inserted into a power tool. The tip is configured to engage a work piece. The shank extends between the drive portion and the tip. The sleeve surrounds at least a portion of the shank. The sleeve includes a groove adjacent the drive portion. The groove is configured to receive a coupling member from the power tool.

The above aspects may be used in any combination with each other. Other aspects of the invention will become apparent by consideration of the detailed description and accompanying drawings.

DETAILED DESCRIPTION OF THE DRAWINGS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
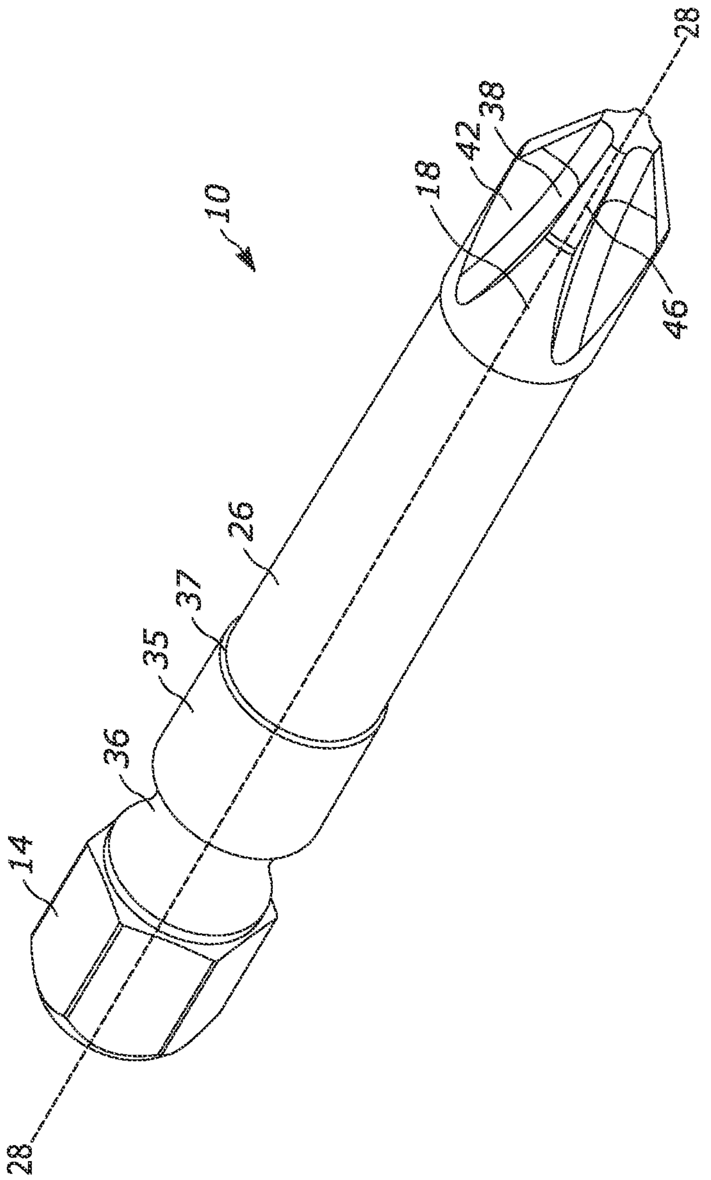
FIG. 1 is a front perspective view of a tool bit in accordance with an embodiment of the invention, the tool bit including a sleeve.
Figure 2:
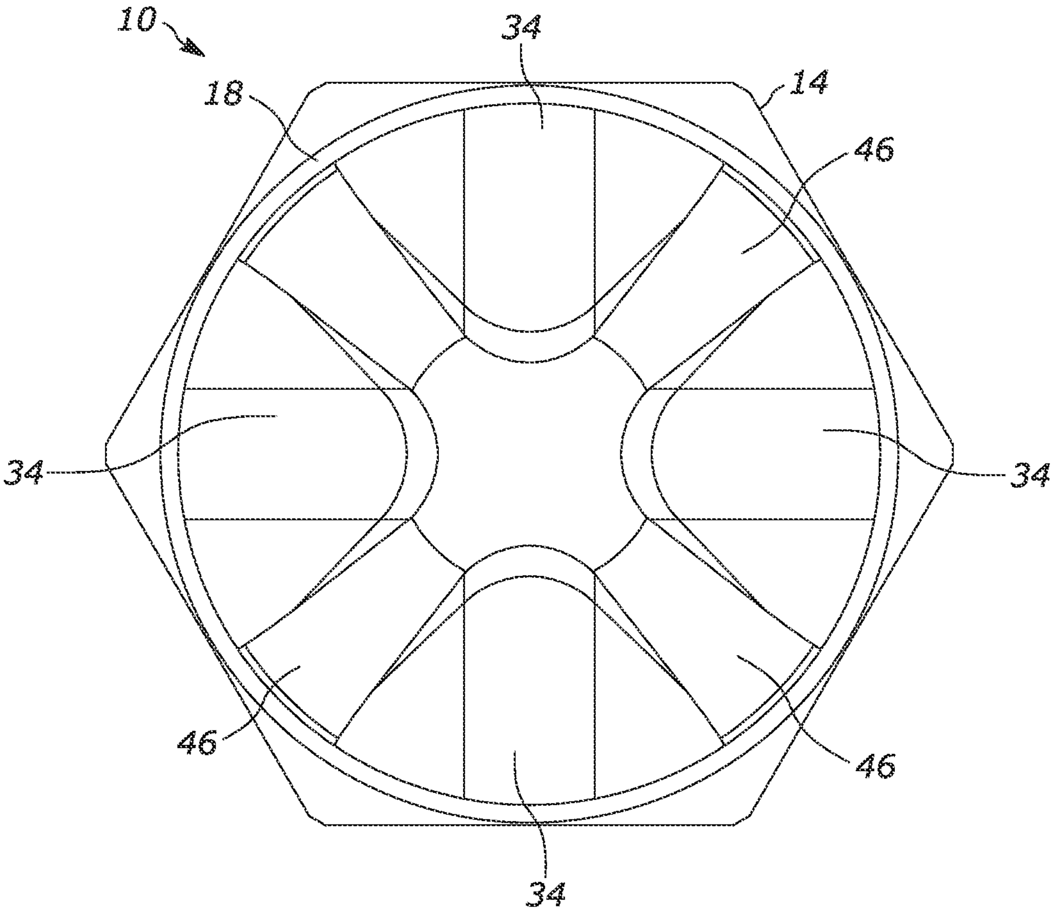
FIG. 2 is a front view of the tool bit with the sleeve of FIG. 1.
Figure 3:
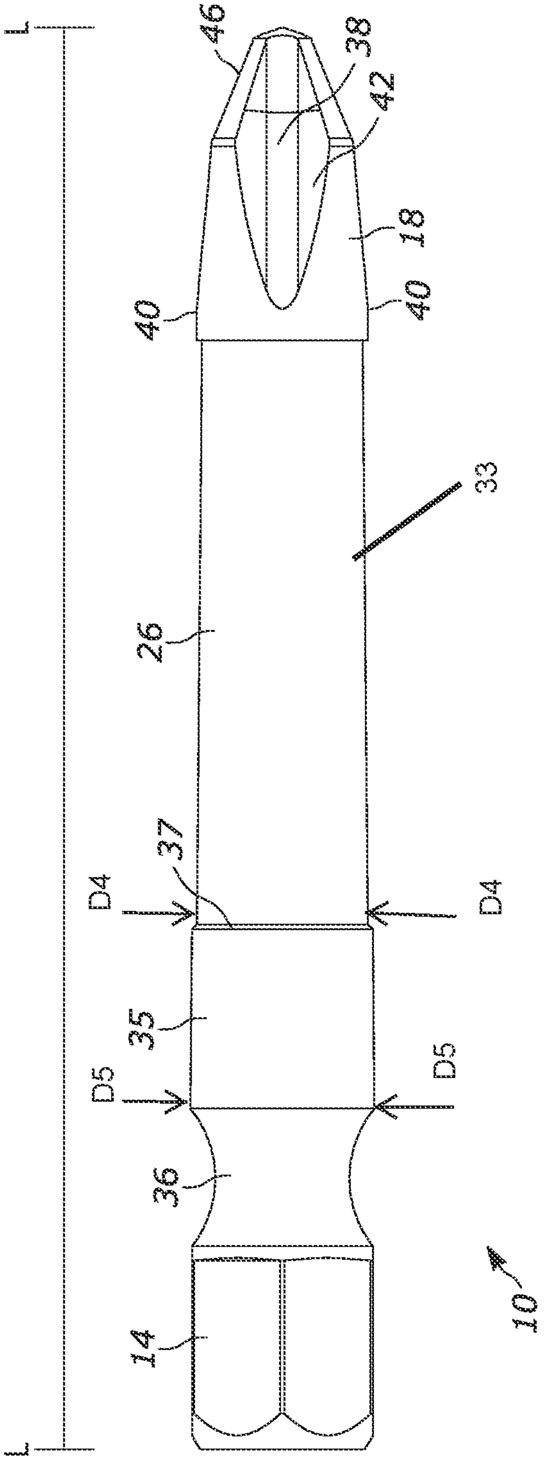
FIG. 3 is a side view of the tool bit with the sleeve of FIG. 1.

FIGS. 1-3 illustrate a tool bit 10. In the illustrated embodiment, the tool bit 10 is a driver bit configured to drive a fastener (e.g., a screw). In other embodiments, the tool bit 10 may be a different type of bit, such as a drill bit (e.g., a twist bit, a spade bit, a step bit, etc.). The tool bit 10 may also be part of an adapter, arbor, drive guide, or other bit holder configured to hold another bit or tool.

The illustrated tool bit 10 includes a drive portion 14, a tip 18, a shank 22 (FIG. 4) interconnecting the drive portion 14 and the tip 18, and a sleeve 26 surrounding at least a portion of the shank 22. The drive portion 14 forms a first end of the tool bit 10. The tip 18 forms a second end of the tool bit 10, opposite the drive portion 14. In the illustrated embodiment, the drive portion 14, the tip 18, and the shank 22 are integrally formed as a single piece. For example, the drive portion 14, the tip 18, and the shank 22 may be formed of a relative hard material, such as steel. In other embodiments, the drive portion 14, the tip 18, and the shank 22 may be separate pieces that are permanently or removably coupled together. In such embodiments, the drive portion 14, the tip 18, and the shank 22 may be made of different materials or the same material. The tool bit 10 also includes a central longitudinal axis 28 extending through the drive portion 14, the shank 22, and the tip 18. The central longitudinal axis 28 defines a rotational axis of the tool bit 10.

The drive portion 14 is configured to be engaged by any number of different tools, adapters, or components to receive torque from the tool, adapter, or component to rotate the bit 10. For example, the bit 10 may be utilized with a driver including a socket having a corresponding recess in which the drive portion 14 of the bit 10 is received. The driver may also include a stem extending from the socket, which may be coupled to a handle for hand-use by an operator or to a chuck of a power tool (e.g., a drill) for powered use by the operator. A sliding, frictional fit between the drive portion 14 of the bit 10 and the socket may be used to axially secure the bit 10 to the driver. Alternatively, a quick-release structure may be employed to axially secure the bit 10 to the driver. The illustrated drive portion 14 is a hexagonal drive portion having a hexagonal cross-section. In other embodiments, the drive portion 14 may have other suitable shapes.

Figure 5:
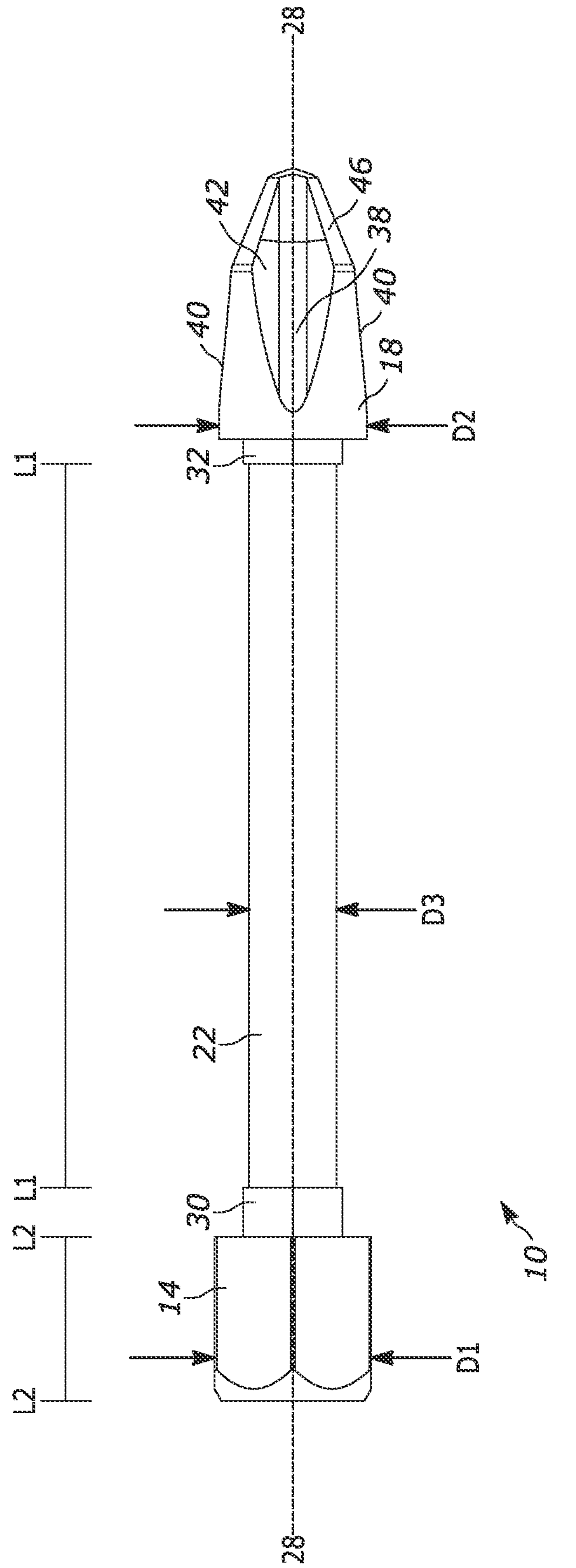
FIG. 5 is a side view of the tool bit of FIG. 1 without the sleeve.

As illustrated in FIG. 5, the drive portion 14 has a maximum outer dimension D1. The maximum outer dimension D1 is measured perpendicular to the central longitudinal axis 28. In the illustrated embodiment, the maximum outer dimension D1 is measured between opposing corners of the hexagonal drive portion 14. In other embodiments, the maximum outer dimension D1 may be measured between other extremities of the drive portion 14, depending on the shape of the drive portion 14.

Referring back to FIGS. 1-3, the tip 18 is coupled to an end of the shank 22 opposite from the drive portion 14. The tip 18 provides a working end or head for the tool bit 10 and is configured to engage a fastener (e.g., a screw). In the illustrated embodiment, the tip 18 is configured as a Philips-style tip. Alternatively, the tip 18 may have other configurations to engage different styles of fasteners. For example, the tip 18 may be configured as a straight blade (otherwise known as a "regular head") to engage fasteners having a corresponding straight slot. Other tip configurations (e.g., hexagonal, star, square, etc.) may also be employed with the bit 10. In still other embodiments, the tip 18 may be a cutting element, such as a drill bit tip.

The tip 18 includes a plurality of flutes 38, or recesses, circumferentially spaced around the tip 18. The illustrated flutes 38 are equidistantly disposed about the axis 28. The flutes 38 extend longitudinally along the tip 18 and converge into vanes 40. The vanes 40 are formed with flat, tapered side walls 42 and outer walls 46, such that the outer walls 46 are inclined and form the front ends of the vanes 40. The vanes 40 are also equidistantly disposed around the tip 18. In the illustrated embodiment, the vanes 40 gradually increase in thickness towards the shank 22, which increases the strength of the bit 10.

As illustrated in FIG. 5, the tip 18 has a maximum outer dimension D2. The maximum outer dimension D2 is measured perpendicular to the central longitudinal axis 28. In the illustrated embodiment, the maximum outer dimension D2 is measured between opposing vanes 40 of the tip 18. In particular, the maximum outer dimension D2 is measured near the shank 22 where the sizes of the vanes 40 is greatest. In other embodiments, the maximum outer dimension D2 may be measured between other extremities of the tip 18, depending on the shape of the tip 18. The illustrated maximum outer dimension D2 of the tip 18 is generally equal to the maximum outer dimension D1 of the drive portion 14. In other embodiments, the maximum outer dimension D2 of the tip 18 may be larger or smaller than the maximum outer dimension D1 of the drive portion 14.

Figure 4:
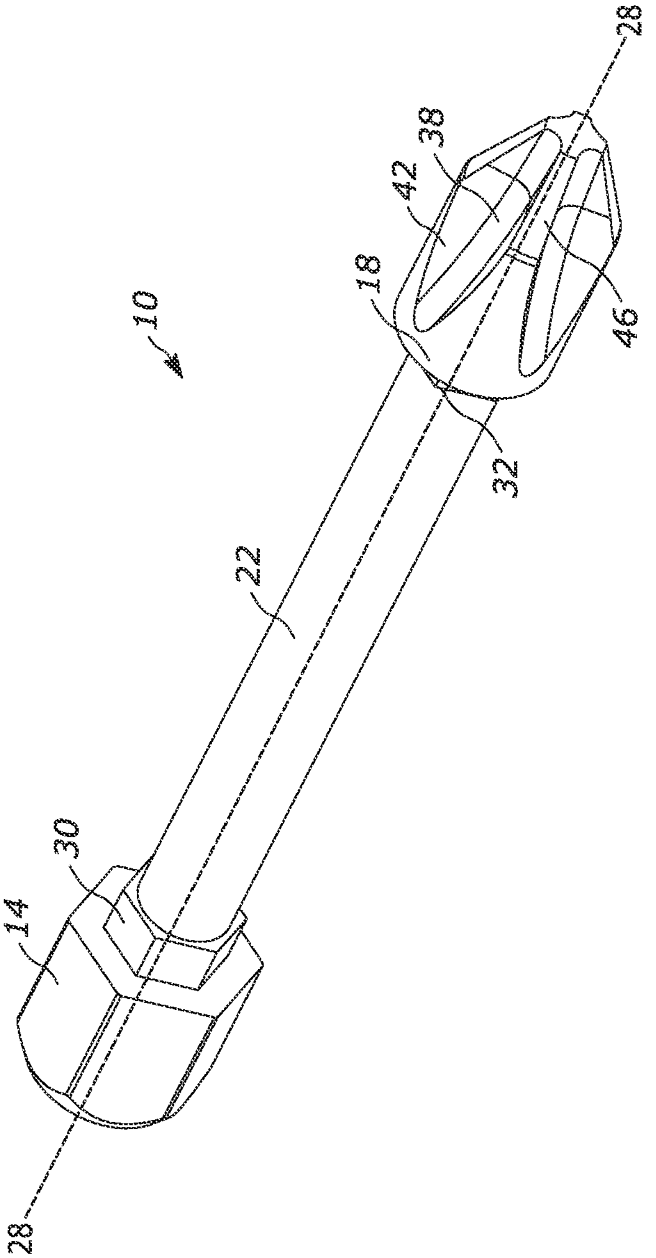
FIG. 4 is a front perspective view of the tool bit of FIG. 1 without the sleeve.
Figure 6:
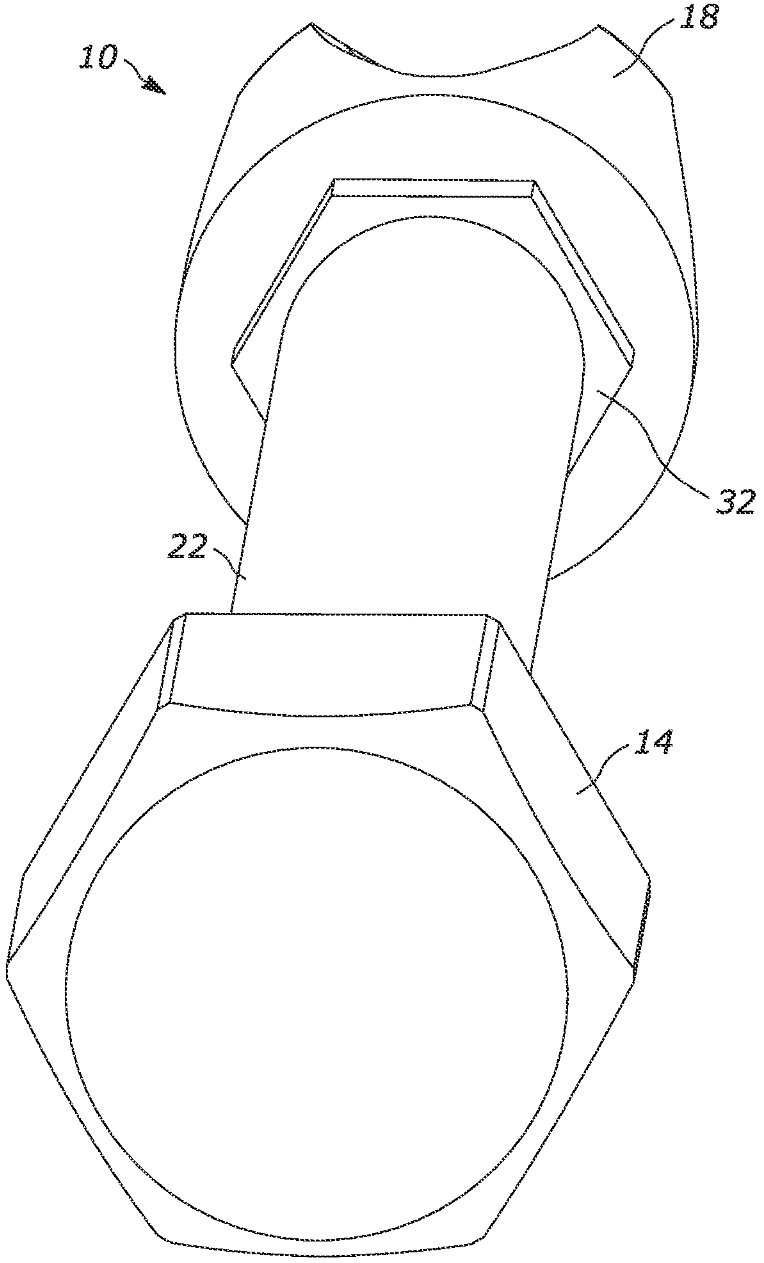
FIG. 6 is a rear perspective view of the tool bit of FIG. 1 without the sleeve.

As illustrated in FIGS. 4-6, the shank 22 extends between the drive portion 14 and the tip 18. The illustrated shank 22 is generally cylindrical. In other embodiments, the shank 22 may have other shapes or configurations. For example, the shank 22 may have a hexagonal or square cross-section, or the shape of the shank 22 may vary along its length. The illustrated shank 22 has a length L1 that is longer than a length L2 of the drive portion 14. The lengths L1, L2 are measured parallel to the central longitudinal axis 28. In some embodiments, the length L1 of the shank 22 is at least twice as long as the length L2 of the drive portion 14. In other embodiments, the length L1 of the shank 22 is at least three times as long as the length L2 of the drive portion 14. In some embodiments, the length L1 of the shank 22 is between about two times and about ten times the length L2 of the drive portion 14. In the illustrated embodiment, the length L1 of the shank 22 is about five times the length L2 of the drive portion 14.

In embodiments where the tool bit 10 is a driver bit (such as the illustrated embodiments), the length L1 of the shank 22 is also longer than a length L3 of the tip 18. In such embodiments, the length L1 of the shank 22 is a majority of a total length L (FIG. 3) of the tool bit 10. For example, shank 22 may form between 50% and 90% of the total length L of the tool bit 10. In other embodiments, the shank 22 may form between 50% and 75% of the total length L of the tool bit 10. In the illustrated embodiment, the shank 22 forms about 65% of the total length L of the tool bit 10.

The shank 22 also has a maximum outer dimension D3. The maximum outer dimension D3 is measured perpendicular to the central longitudinal axis 28. In the illustrated embodiment, the maximum outer dimension D3 is a diameter of the shank 22. In other embodiments, the maximum outer dimension D3 may be a different dimension, depending on the shape and configuration of the shank 22. The maximum outer dimension D3 of the shank 22 is less than the maximum outer dimension D1 of the drive portion 14. In addition, the maximum outer dimension D3 of the shank 22 is less than the maximum outer dimension D2 of the tip 18. As such, the shank 22 has a reduced diameter compared to the remainder of the tool bit 10. The reduced diameter of the shank 22 removes localized regions of high stress and discontinuities, thereby increasing the durability of the shank 22 to extend the operational lifetime of the tool bit 10. In some embodiments, the maximum outer dimension D3 of the shank is less than 75% of the maximum outer dimension D1 of the drive portion 14 and/or the maximum outer dimension D2 of the tip 18. In other embodiments, the maximum outer dimension D3 of the shank 22 is between about 25% and about 75% of the maximum outer dimension D1 of the drive portion 14 and/or the maximum outer dimension D2 of the tip 18. In the illustrated embodiment, the maximum outer dimension D2 of the shank 22 is about 50% of the maximum outer dimension D1 of the drive portion 14 and/or the maximum outer dimension D2 of the tip 18.

As shown in FIG. 5, the illustrated drive portion 14 includes a drive hex portion or a first retaining portion 30 connected to the shank 22, and the illustrated tip 18 includes a tip hex portion or a second retaining portion 32 connected to the shank 22. In the illustrated embodiment, the first retaining portion 30 and the second retaining portion 32 each have a hex-shaped cross-section. In other embodiments, the first retaining portion 30 and the second retaining portion 32 may have other polygonal or non-circular cross-sections. For example, the cross-sections may be square-shaped, D-shaped, oval-shaped, and the like. In some embodiments, the first retaining portion 30 and the second retaining portion 32 may have cross-sections that are different from each other. The illustrated shank 22 has a smooth outer surface extending between the drive hex portion 30 and the tip hex portion 32. In other embodiments, the outer surface of the shank 22 may be textured or have other features. Each of the drive hex portion 30 and the tip hex portion 32 has a larger outer dimension than the maximum outer dimension D3 of the shank 22. The drive hex portion 30, however, has a smaller outer dimension than the drive portion 14. Additionally, the tip hex portion 32 has a smaller outer dimension than the tip 18. The tip hex portion 32 may have an outer dimension greater than, less than, or equal to the drive hex portion 30.

As shown in FIG. 1, the sleeve 26 is positioned around at least a portion of the shank 22 (FIGS. 4-6). The illustrated sleeve 26 surrounds the entire shank 22 between the drive portion 14 and the tip 18. In other embodiments, the sleeve 26 may only surround part of the shank 22 between the drive portion 14 and the tip 18. The sleeve 26 is made of a softer and more flexible material than the shank 22. For example, the sleeve 26 may be made of a polymer. Specifically, the sleeve 26 may be formed of high-density polyethylene (HDPE) or similar polymer. In the illustrated embodiment, the sleeve 26 is injection molded over the shank 22. The sleeve 26 may be inhibited from moving relative to the shank 22 due to the injection molding. That is, the sleeve 26 may be rigidly secured between the drive portion 14 and the tip 18 of the tool bit 10 due to the injection molding. In other embodiments, the sleeve 26 may be separately formed and slid onto the shank 22 (e.g., over the drive portion 14 or the tip 18). The drive hex portion 30 and the tip hex portion 32 help connect and retain the sleeve 26 on the shank 22. For example, when the sleeve 26 is positioned around (e.g., injection molded onto) the shank 22, the drive hex portion 30 and the tip hex portion 32 engage an inner surface of the sleeve 26 to inhibit the sleeve 26 from moving (e.g., rotating) relative to the shank 22. In some embodiments, the tool bit 10 may only include one of the drive hex portion 30 and the tip hex portion 32, and/or the sleeve 26 may only engage one of the drive hex portion 30 and the tip hex portion 32.

In other embodiments, the drive portion 14 may include a drive protrusion portion having a different polygonal shape than hexagonal. In such embodiments, the tip 18 may also include a tip protrusion portion having a different polygonal shape than hexagonal. For example, the drive protrusion portion and the tip protrusion portion may have any combination of shapes including triangular, square, pentagonal, octagonal or any other multisided shape. In further embodiments, the tool bit 10 may include a series of protrusions having any combination of the previously disclosed shapes and distributed in any position along the shank 22 infinitely between the drive portion 14 and the tip 18. In even further embodiments, the tool bit 10 may include a series of recesses, rather than protrusions, having any combination of the previously disclosed shapes and distributed in any position along the shank 22 infinitely between the drive portion 14 and the tip 18.

With reference to FIG. 3, the illustrated sleeve 26 is generally cylindrical, but includes a taper. That is, the sleeve 26 includes a tapered portion 33. In particular, the tapered portion 33 increases in diameter from the tip 18 toward the drive portion 14. Stated another way, a maximum outer dimension D4 of the tapered portion 33 decreases as the tapered portion 33 extends toward the tip 18. The tapered portion 33 helps reduce wobble of the tool bit 10 during operation. In other embodiments, the sleeve 26 may have a relatively constant outside diameter.

The illustrated sleeve 26 also defines a power groove 36 adjacent the drive portion 14. The power groove 36 is a continuous annular recess formed around the sleeve 26. The power groove 36 is configured to receive a coupling member, such as a quick-release structure (e.g., a ball detent) from a tool (e.g., a driver) to retain and axially secure the tool bit 10 to the tool. In other embodiments, the power groove 36 may be part of the drive portion 14 and formed of the same material as the drive portion 14. In such embodiments, the sleeve 26 may "start" after the power groove 36.

In addition, the illustrated sleeve 26 includes a raised portion 35 between the tip 18 and the power groove 36. As such, the groove 36 is defined between the raised portion 35 and the drive portion 14. With reference to FIG. 3, in the illustrated embodiment, the raised portion 35 has a maximum outer dimension D5 that is substantially equal to the maximum outer diameter D1 of the drive portion 14. The raised portion 35 is defined by a lip or step 37 extending around a circumference of the sleeve 26. The tapered portion 33 of the sleeve 26 extends from the raised portion 35 at the lip 37 to the tip 18. Therefore, the outer dimension D4 of the tapered potion 33 decreases as the tapered portion 33 extends between the raised portion 35 of the sleeve 26 and the tip 18. In some embodiments, the raised portion 35 may be omitted such that the sleeve 26 has either a continuous taper or a constant diameter between the tip 18 and the power groove 36.

With reference to FIGS. 1 and 4, the tool bit 10 is manufactured from bar stock. In other embodiments, the shank 22 may be formed of other types of metals. The shank 22 is machined to a particular length to facilitate elastic deformation of the shank 22 when the tool bit 10 is utilized with, for example, an impact driver. In some embodiments, the entire bit may be treated to an initial, relatively low hardness level and then the tip 18 may undergo shot peening. In other embodiments, the tool bit 10 (without the sleeve 26) may undergo other manufacturing processes for improving the physical properties of the tool bit 10 such as a laser blasting manufacturing process or a laser ablation manufacturing process.

Each of the materials of the shank 22 and the sleeve 26 has a Young's modulus and a Shear modulus. Young's Modulus is the ratio of axial stress to strain and provides an indication of how easily a material may stretch and deform. The Young's modulus of the bar stock of the shank 22 has a percent difference with the Young's modulus of the polymer of the sleeve 26 that is between 180 and 210 percent. In other words, the Young' modulus of the shank 22 may be between 80 and 110 percent greater than the Young's modulus of the sleeve 26. Shear Modulus is the ratio of shear stress to shear strain and provides an indication the ability of a material to resist transverse deformations. The Shear modulus of the bar stock of the shank 22 has a percent difference with the Shear modulus of the polymer of the sleeve 26 that is between 170 and 210 percent. In other words, the Shear modulus of the shank 22 may be between 70 and 110 percent greater than the Shear modulus of the sleeve 26. As such, the shank 22 and the sleeve 26 may be formed respectively of any ferrous metal and any polymer falling within these percent difference ranges. For example, the shank 22 may be formed of, among other ferrous metals, a high carbon steel, a low carbon steel, or a stainless steel. Additionally, the sleeve 26 may be formed of, among other polymers, any thermoplastic, such as PET, PVC, or nylon, or any thermosetting polymer, such as polyester, epoxy, phenolic.

In operation of the tool bit 10, a user may insert the drive portion 14 into a tool by means of a socket, a chuck, or the like. The hexagonal cross-section of the drive portion 14 enables the tool bit 10 to secure to the tool. Additionally, the power groove 36 of the sleeve 26 provides another securing means between the tool bit 10 and the tool. Once the tool bit 10 is secured to the tool, the reduced diameter D3 of the shank 22 is configured to increase the impact resistance or the toughness of the tool bit 10, such that the tip 18 of the tool bit 10 is allowed to elastically deform or twist relative to the drive portion 14 about the central longitudinal axis 28 of the tool bit 10. That is, the shank 22 is sized to absorb impact energy during use of the tool bit 10 with a workpiece.

The sleeve 26 is configured to absorb a portion of the impact energy that the tool bit 10 receives while operating on a workpiece. In addition, the sleeve 26 allows the tool bit 10 to have longer and thinner shanks 22 compared to a similarly-configured tool bit without a sleeve. Thus, the sleeve 26 increases the structural strength of the tool bit 10 such that the risk of fracture is reduced at each length and width of the shank 22. Increasing the length and reducing the diameter of the shank 22 further increases the impact resistance or toughness of the tool bit 10. The sleeve 26 also provides a color band on the tool bit 10. The color band provides a color change on the tool bit 10 from a metallic color of the drive portion 14, the tip portion 18, and the shank 22 to a user predetermined color (e.g., red). The color band provides improved printing capability on the tool bit 10. More specifically, identifiers such as logos or indicia may be more easily printable and distinguishable on the color band provided by the sleeve 26 than the metallic surface provided by the shank 22.

FIG. 7-10 illustrate another tool bit 110. The illustrated tool bit 110 is similar to the tool bit 10 described above with reference to FIGS. 1-3. As such, like parts have been given like reference numbers, plus 100. Description of the tool bit 10 above applies equally to the tool bit 110. Only the differences between the tool bits 10, 110 are explained below.

Similar to the tool bit 10, the illustrated tool bit 110 includes a drive portion 114, a tip portion 118, a shank 122 (FIGS. 8-10), and a sleeve 126. In the illustrated embodiment, the shank 122 has a grooved outer surface extending between the drive portion 114 and the tip 118. The grooved outer surface is formed by one or more grooves 130. In the illustrated embodiment, the grooved outer surface is formed by a plurality of grooves 130. The grooves 130 extend between the drive portion 114 and the tip 118. Each of the grooves 130 extends nonlinearly from the drive portion 114 to the tip 118. As viewed in FIG. 10, each of the grooves 130 extends in a rightwardly biased spiral from the drive portion 114 to the tip 118. In other words, the grooves 130 are helically wrapped around a central longitudinal axis 128 of the tool bit 110. Further, the grooves 130 are positioned concentrically around the central longitudinal axis 128, and thus the outer surface of the shank 22.

The grooves 130 help connect and retain the sleeve 126 on the shank 122. For example, when the sleeve 126 is positioned around (e.g., injection molded onto) the shank 122, the grooves 130 engage an inner surface of the sleeve 126 to inhibit the sleeve 126 from moving (e.g., rotating) relative to the shank 122. Specifically, at least portion of the sleeve 126 may fill the grooves 130 when the sleeve 126 is injection molded onto the shank 122.

Figure 7:
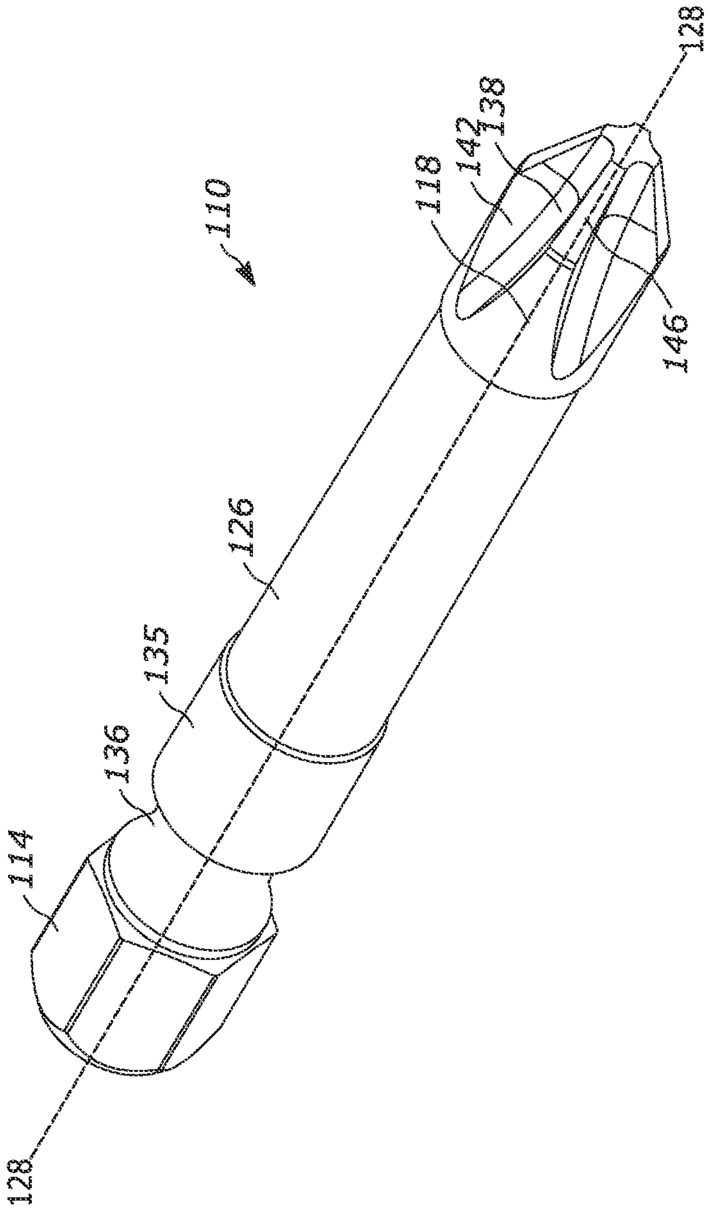
FIG. 7 is a front perspective view of a tool bit in accordance with another embodiment of the invention, the tool bit including a sleeve.
Figure 8:
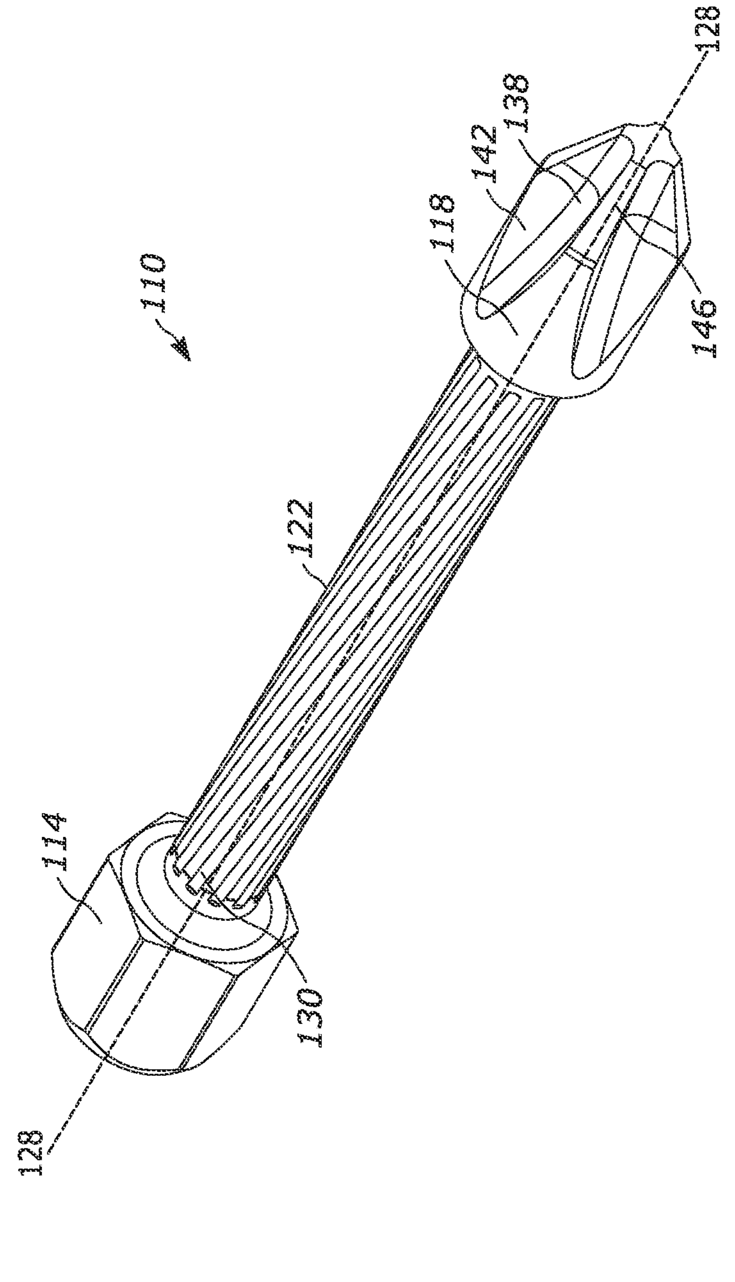
FIG. 8 is a perspective view of the tool bit of FIG. 7 without the sleeve.
Figure 9:
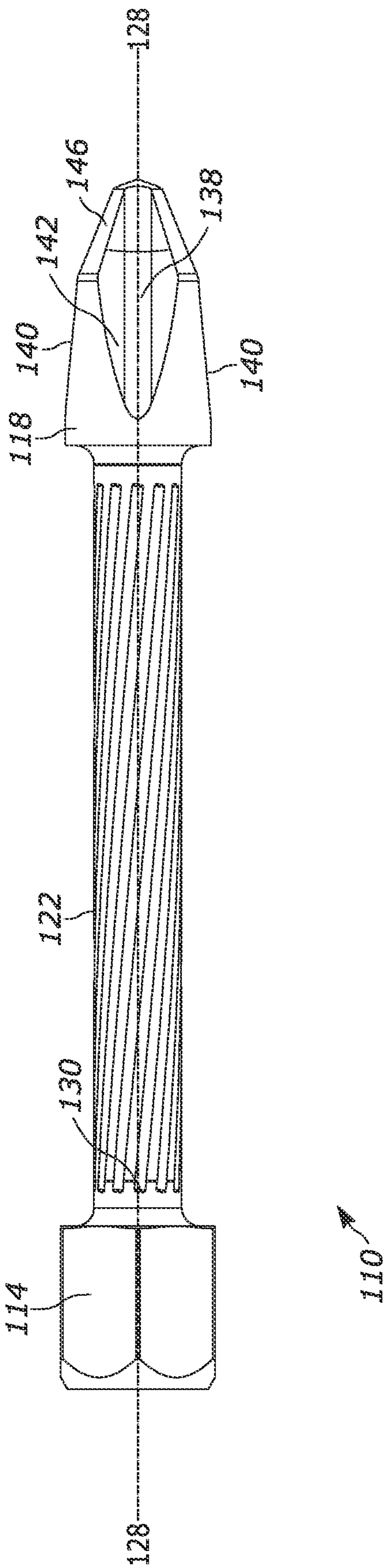
FIG. 9 is a side view of the tool bit of FIG. 7 without the sleeve.
Figure 10:
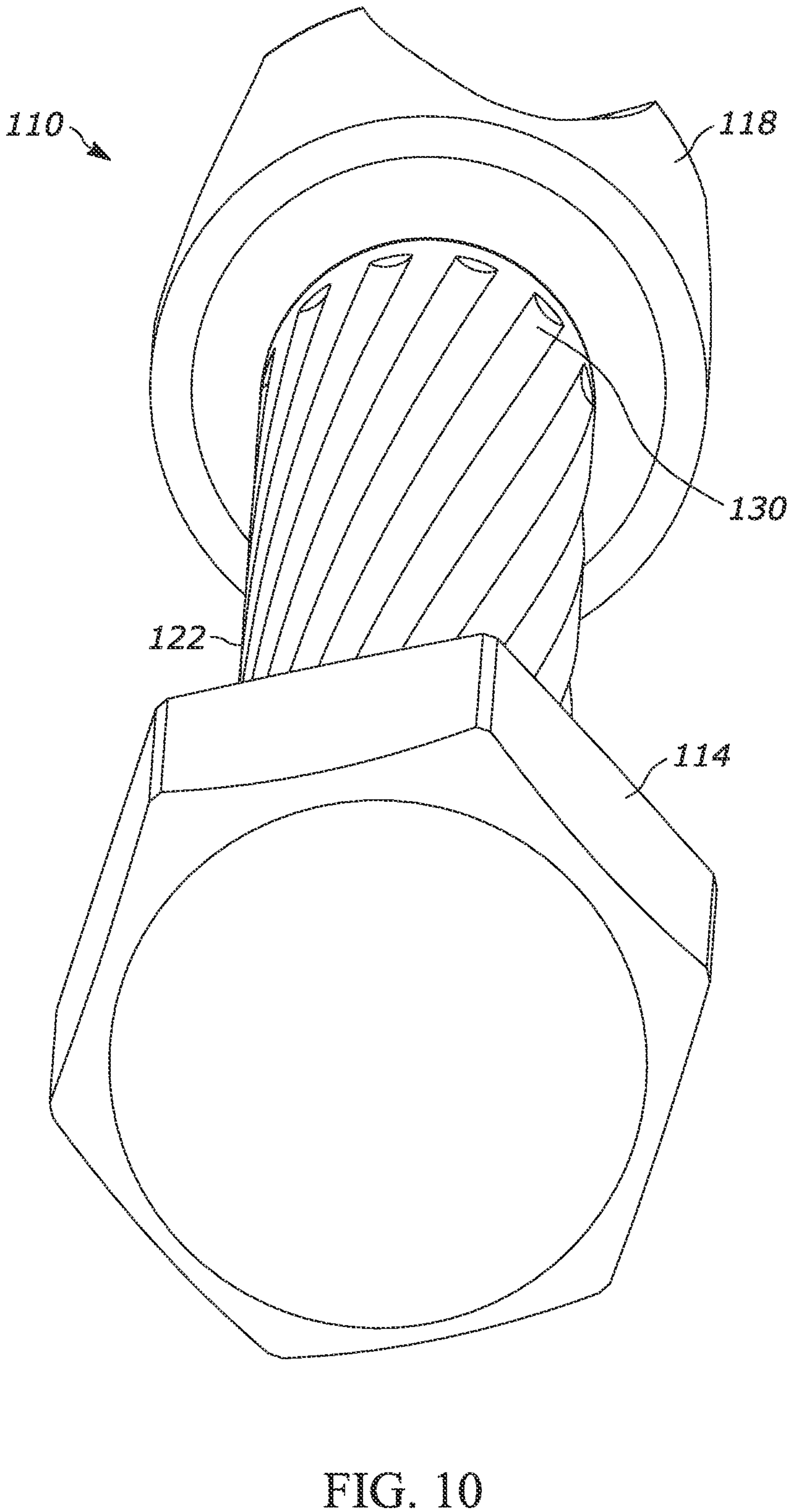
FIG. 10 is a rear perspective view of the tool bit of FIG. 7 without the sleeve.

In other embodiments of the tool bit 10 of FIG. 1 and the tool bit 110 of FIG. 7, the tool bits 10,110 may be formed with the drive hex portion 30 and the tip hex portion 32 illustrated in FIG. 5 and with the grooves 130 illustrated in FIG. 8. In further embodiments, the tool bits 10, 110 may be formed with any combination of the drive hex portion 30, the tip hex portion 32, and the grooves 130. As such, forming the tool bits 10, 110 with a combination of the drive hex portion 30, the tip hex portion 32 and the grooves 130 provides the tool bits 10, 110 with multiple means of retaining and inhibiting movement of the sleeves 26, 126.

Although the invention has been described in detail with reference to certain preferred embodiments, variations and modifications exist within the scope and spirit of one or more independent aspects of the invention as described.

What is claimed:

1. A tool bit comprising:
- a drive portion having a first maximum outer dimension;
- a tip having a second maximum outer dimension;
- a shank extending between the drive portion and the tip, the shank having a third maximum outer dimension that is less than first and second maximum outer dimensions; and
- a sleeve extending from the drive portion to the tip and surrounding the shank, the sleeve including a first end that abuts the drive portion and a second end that abuts the tip.

2. The tool bit of claim 1, wherein the sleeve includes a raised portion, and wherein the raised portion has a maximum outer dimension that is equal to the first maximum outer dimension of the drive portion.

3. The tool bit of claim 1, wherein a groove is formed in the sleeve adjacent the drive portion, and wherein the groove is configured to receive a coupling member from a power tool to couple the tool bit to the power tool.

4. The tool bit of claim 1, wherein the sleeve includes a tapered portion, and wherein an outer dimension of the tapered portion decreases as the tapered portion extends toward the tip.

5. The tool bit of claim 1, wherein the shank is sized to absorb impact energy generated during use of the tool bit.

6. The tool bit of claim 1, wherein the shank is formed of a first material, and wherein the sleeve is formed of a second material that is softer than the first material.

7. The tool bit of claim 6, wherein the shank is formed of metal and the sleeve is formed of a polymer.

8. The tool bit of claim 1, wherein the sleeve is injection molded onto the shank.

9. The tool bit of claim 1, wherein the first maximum outer dimension of the drive portion and the second maximum outer dimension of the tip are equal.

10. The tool bit of claim 1, wherein the third maximum outer dimension of the shank is between about 25% and 75% of the first maximum diameter of the drive portion.

11. A tool bit comprising:
- a drive portion configured to be inserted into a power tool;
- a tip configured to engage a work piece;
- a shank extending between the drive portion and the tip; and
- a sleeve surrounding at least a portion of the shank, the sleeve being injection molded around the at least a portion of the shank and engaging another feature of the tool bit such that the sleeve is inhibited from rotating relative to the shank.

12. The tool bit of claim 11, wherein the drive portion includes a retaining portion having a non-circular cross-section, and wherein the sleeve engages the retaining portion.

13. The tool bit of claim 12, wherein the non-circular cross-section is hex-shaped.

14. The tool bit of claim 11, wherein the tip includes a retaining portion having a non-circular cross-section, and wherein the sleeve engages the retaining portion.

15. The tool bit of claim 14, wherein the non-circular cross-section is hex-shaped.

16. The tool bit of claim 11, wherein the shank includes a plurality of grooves, and wherein the sleeve engages the plurality of grooves.

17. The tool bit of claim 11, wherein the sleeve is injection molded onto the shank over an entire length of the shank such that the sleeve extends from the drive portion to the tip.

18. A tool bit comprising:
- a drive portion configured to be inserted into a power tool;
- a tip configured to engage a work piece;
- a shank extending between the drive portion and the tip; and
- a sleeve surrounding at least a portion of the shank, the sleeve including a groove adjacent the drive portion, the groove configured to receive a coupling member from the power tool.

19. The tool bit of claim 18, wherein the sleeve includes a tapered portion that reduces in diameter toward the tip.

20. The tool bit of claim 18, wherein the sleeve includes a raised portion adjacent the drive portion, and wherein the groove is located between the raised portion and the drive portion.

* * * * *